United States Patent [19]
Fenske

[11] Patent Number: 6,077,465
[45] Date of Patent: Jun. 20, 2000

[54] METHOD OF REPAIRING A VINYL WINDOW FRAME

[76] Inventor: David Joel Fenske, 3144 NE. 46th, Portland, Oreg. 97213

[21] Appl. No.: 09/124,559

[22] Filed: Jul. 29, 1998

[51] Int. Cl.[7] .................................................. B29C 73/02

[52] U.S. Cl. .................. 264/36.22; 52/514.5; 52/742.16; 29/402.18; 156/98

[58] Field of Search .................................. 52/514, 514.5, 52/741.1, 742.14, 742.16; 156/94, 98; 264/36.1, 36.22; 29/402.01, 402.18; 49/506

[56] References Cited

U.S. PATENT DOCUMENTS

| | | | |
|---|---|---|---|
| 4,086,113 | 4/1978 | Cataffo et al. | 156/98 |
| 4,419,162 | 12/1983 | Fischer | 156/94 |
| 4,620,407 | 11/1986 | Schmid | 52/514 X |
| 5,435,866 | 7/1995 | Puppin | 52/514 X |
| 5,554,666 | 9/1996 | Livesay | 522/81 |

*Primary Examiner*—Michael Safavi
*Assistant Examiner*—Kevin D. Wilkens
*Attorney, Agent, or Firm*—Smith-Hill and Bedell

[57] ABSTRACT

A defect in a vinyl window frame is repaired by filling the defect with a PVC filler including a PVC cement and allowing the PVC filler to cure.

3 Claims, 1 Drawing Sheet

METHOD OF REPAIRING A VINYL WINDOW FRAME

BACKGROUND OF THE INVENTION

This invention relates to a method of repairing a vinyl window frame.

Vinyl window frames, made of ultra-high molecular weight polyvinyl chloride (PVC), are widely used in new residential construction and remodeling. The vinyl window frames are typically white and are advantageous because they do not require painting and provide a fairly good thermal barrier. A vinyl window frame is constructed from lengths of vinyl profile which are bonded together in the desired configuration by heat sealing.

A vinyl window frame may be damaged by settling of the structure in which the window frame is installed. Other possible sources of damage are impacts of stray nails during installation of siding and knife cuts during installation of drywall material. A vinyl window frame may also be damaged during manufacture or during transportation to the site of installation.

Some types of damage to a vinyl window frame can be repaired using an air jet welder, but this technique is not practical for repairing a window frame that has already been installed and is also limited to a particular type of repair. It may be possible to return a damaged window frame to the manufacturer for repair, but this is not generally a practical possibility. Consequently, many times when a vinyl window frame is damaged, the only practical option if to discard the frame as scrap. If the frame has already been installed, it is necessary to remove the damaged frame and install a new window frame.

PVC is also used for piping. A length of PVC pipe can be connected to a fitting having a suitable socket using a PVC solvent. A thin coating of solvent is applied to the interior of the socket and to the end of the pipe. The pipe is inserted in the socket and the two parts are sealed together.

It is known to repair PVC piping using a cement made of raw PVC dissolved in a PVC solvent.

SUMMARY OF THE INVENTION

In accordance with a first aspect of the invention there is provided a method of repairing a defect in a vinyl window frame, comprising filling the defect with a PVC filler including a PVC cement, and allowing the PVC filler to cure.

In accordance with a second aspect of the invention there is provided a method of repairing a defect in a vinyl window frame, comprising cutting the defect out of the window frame leaving a hole in the window frame, providing a patch sized and shaped to fit in the hole, placing the patch in the hole and securing it to the window frame with a PVC filler including a PVC cement, and allowing the PVC filler to cure.

BRIEF DESCRIPTION OF THE DRAWINGS

For a better understanding of the invention, and to show how the same may be carried into effect, reference will now be made, by way of example, to the accompanying drawings, in which.

DETAILED DESCRIPTION

Figure 1:
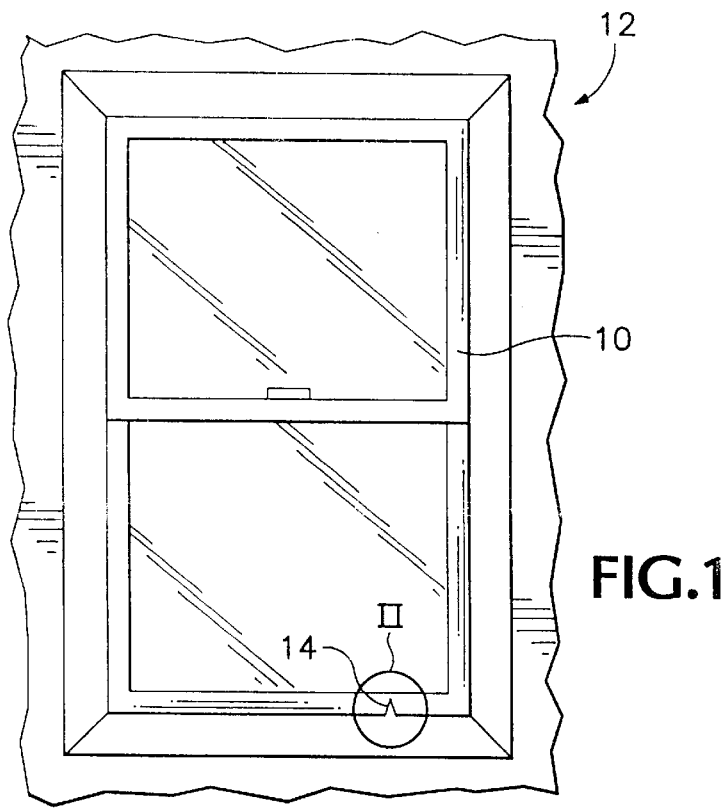
FIG. 1 is a general elevation view of a window frame that has been installed in a wooden frame but has been damaged, FIGS. 2A–2C, collectively referred to as FIG. 2, illustrate the detail II of FIG. 1 at successive stages during repair of the damage by a first method in accordance with the present invention, and FIGS. 3A–3D, collectively referred to as FIG. 3, illustrate successive stages during repair of damage to a window frame by a second method in accordance with the present invention.

FIG. 1 illustrates schematically a window frame 10 installed in a wood structure 12. The window frame is made of high density PVC. The frame will generally be white, but other colors of frames are also possible. The frame has been gouged at 14, e.g. by a drywall knife. The gouge 14 does not impair significantly the structural integrity of the window frame 10 but it is unsightly and, under normal circumstances, the presence of the gouge would necessitate that the window frame 10 be removed and a new window frame installed.

Figure 2A:
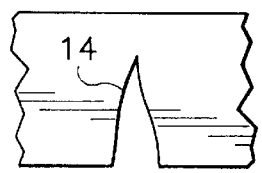
Figure 3A:
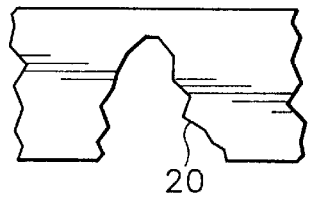
Figure 2B:
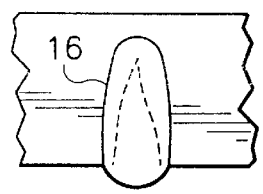
Figure 3B:
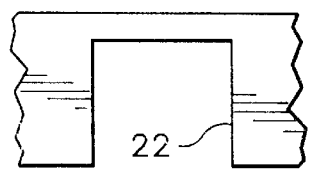
Figure 2C:
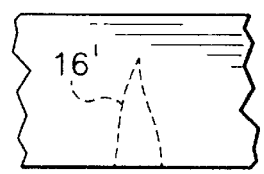
Figure 3C:
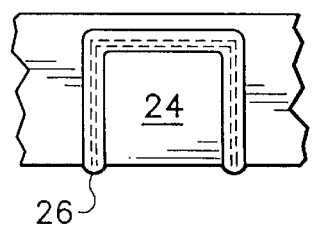
Figure 3D:
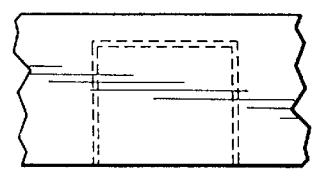

Referring to FIG. 2, the gouge 14 is filled with a PVC filler. A suitable filler can be made by adding pigment to a clear PVC cement to give a paste-like consistency. The pigment is selected so that the filler will match the color of the window frame. For example, white titanium dioxide pigment may be used in the case of a white window frame. It is preferred that the PVC cement be fairly heavy bodied, but even a light bodied cement can be used. Suitable clear PVC cements are used for repair of PVC pipe and fittings and are sold by Oatey Manufacturing of Cleveland, Ohio and by IPS Corporation under the designation WELD-ON. Sufficient filler is used to fill the gouge and stand slightly proud of the surrounding frame, as shown in FIG. 2B. When the filler has cured, the fillet 16 is securely bonded to the frame and it can be sanded down flush with the surrounding frame using a fine abrasive. The sanded fillet 16' is barely perceptible.

FIG. 3 shows a rather large chip 20 having been made in the frame. It is possible to repair the chip by cutting out the material around the chip to form a hole 22 of a desired shape, for example a rectangle, as shown in FIG. 3B. A patch 24 of PVC can then be cut to fit the hole 22 in the frame and it can be bonded in place using the PVC filler 26 (FIG. 3C). When the filler has cured, any surplus filler can be removed by sanding using a fine abrasive. The repair is barely perceptible and the structural integrity of the frame is not significantly impaired.

The repair techniques described above are not limited in their application to in situ repair of a window frame and they may also be applied for repairing a window frame damaged at the site of manufacture or in transit.

The techniques described above are not limited to repairing gouges and chips. For example, they may be used to repair a hole made by a stray nail. In addition, they may be used to repair a defective joint formed between two lengths of vinyl profile in manufacture of a window frame.

It will be appreciated that the invention is not restricted to the particular embodiment that has been described, and that variations may be made therein without departing from the scope of the invention as defined in the appended claims and equivalents thereof. For example, in some applications, where aesthetic considerations are not considered important, the cement might not include a pigment.

What is claimed is:

1. A method of repairing a defect in a window frame composed of lengths of vinyl profile, the method comprising:

filling the defect with a PVC filler composed of a PVC cement and a pigment such that the PVC filler matches the window frame in color, and allowing the PVC filler to cure.

2. A method according to claim 1, wherein the PVC cement is composed of a PVC solvent and high density PVC dissolved therein.

3. A method according to claim 1, further comprising finishing the PVC filler to conform to the surrounding surface of the window frame.

* * * * *